United States Patent [19]
Spencer et al.

[11] Patent Number: 4,645,431
[45] Date of Patent: Feb. 24, 1987

[54] HYDRAULIC PUMPING APPARATUS AND METHOD OF OPERATION

[75] Inventors: Larry K. Spencer, Dallas; Clyde D. Wilson; Robert Vanlangendonck, both of Houston, all of Tex.

[73] Assignee: Sigma Enterprises, Inc., Dallas, Tex.

[21] Appl. No.: 819,476

[22] Filed: Jan. 16, 1986

Related U.S. Application Data

[63] Continuation of Ser. No. 595,274, Mar. 30, 1984, abandoned.

[51] Int. Cl.$^4$ ................................................ F04B 9/12
[52] U.S. Cl. .................................... 417/401; 91/297; 91/307; 91/319
[58] Field of Search .................. 417/401, 402; 91/307, 91/319, 297, 298, 300, 304, 400

[56] References Cited

U.S. PATENT DOCUMENTS

| | | | |
|---|---|---|---|
| 2,834,295 | 5/1958 | Hjarpe | 91/307 X |
| 2,889,817 | 6/1959 | Hard af Segerstad | 91/319 X |
| 3,489,100 | 1/1970 | Hill | 91/307 |
| 3,963,383 | 6/1976 | Hill | 417/401 |
| 4,042,311 | 8/1977 | Yonezawa | 417/401 |
| 4,093,406 | 6/1978 | Miller | 417/401 |

FOREIGN PATENT DOCUMENTS

| | | | |
|---|---|---|---|
| 770709 | 3/1957 | United Kingdom | 417/402 |
| 1215760 | 12/1970 | United Kingdom | 417/401 |

Primary Examiner—Leonard E. Smith
Attorney, Agent, or Firm—Crutsinger & Booth

[57] ABSTRACT

A hydraulically actuated pumping apparatus including a piston-driven, plunger-type injection pump in combination with a three-way normally closed pilot-operated relay valve, and a variable restrictor adjustable during operation of the pumping apparatus for controlling the flow of a pilot fluid to the relay valve. Pilot fluid is vented from the relay valve through passageways in the plunger of the injection pump at the completion of each pumping stroke.

11 Claims, 3 Drawing Figures

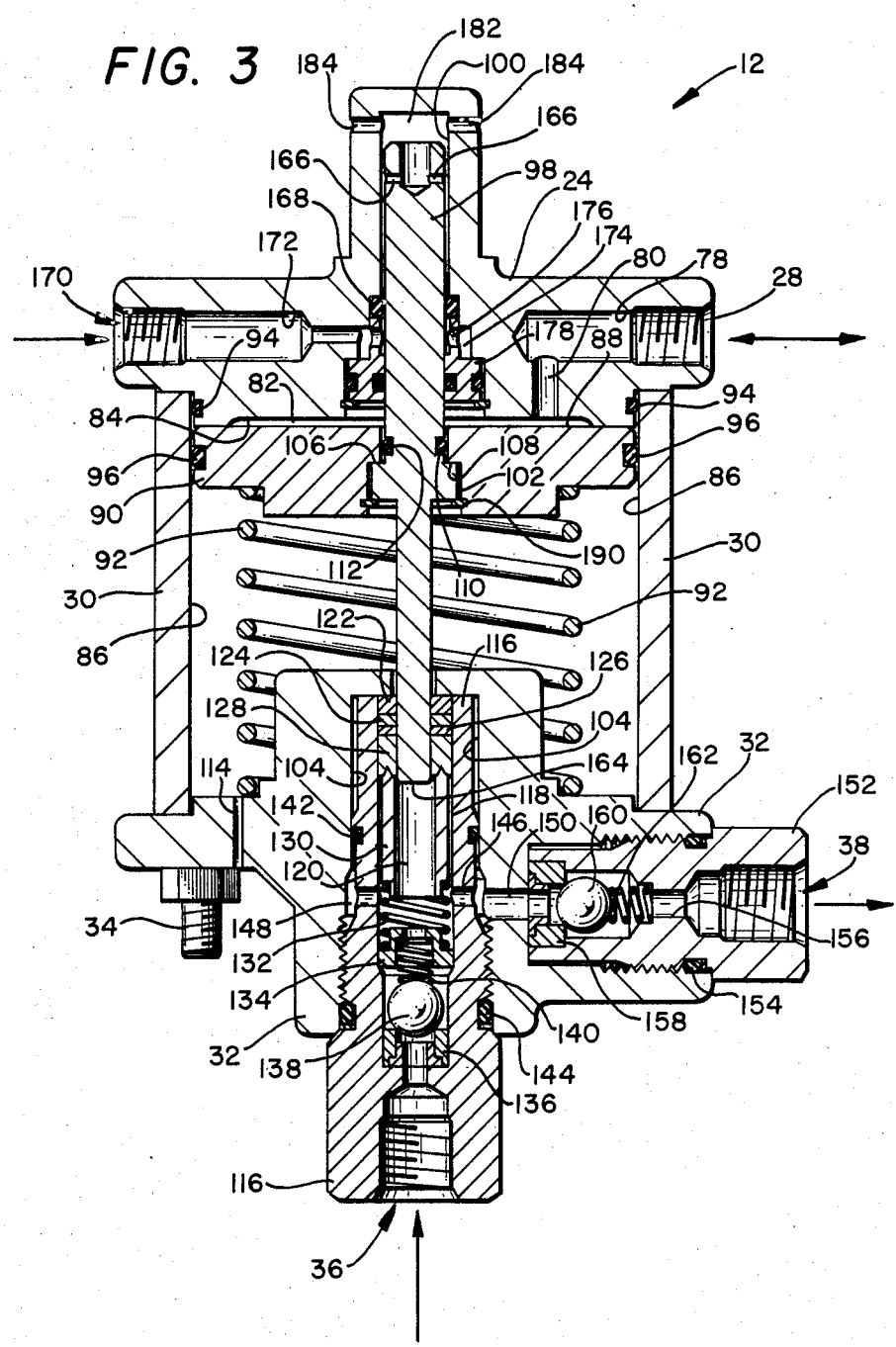

HYDRAULIC PUMPING APPARATUS AND METHOD OF OPERATION

This is a continuation of copending application Ser. No. 595,274 filed Mar. 30, 1984, now abandoned.

TECHNICAL FIELD

This invention relates to pumps, and more particularly, to hydraulic injection pumps. One aspect of the invention relates to pneumatically actuated pumps adapted to inject fluids into a pressurized line or vessel at a controlled rate. Another aspect of the invention relates to an injection pumping apparatus comprising a unique and superior relay valve. Still another aspect of the invention relates to an improved method for controlling air flow through a fluid actuated hydraulic pumping apparatus.

BACKGROUND ART

Pneumatically driven injection pumps are well known. Such pumps are particularly useful for injecting small amounts of liquids into vessels or flow lines at relatively high pressures. These pumps typically employ a low pressure air supply to drive a large diameter piston that coacts with a small diameter plunger to multiply the pressure delivered through the high pressure injection cylinder. The required supply gas pressure is determined by dividing the desired injection pressure by the published pump ratio. The flow of supply gas to the large diameter piston is controlled by a relay valve adapted to cycle the pump frequently enough so as to achieve the desired flow rate. Different relay valve configurations have been utilized by the manufacturers of the various conventional, commercially available pumps. These include valves employing mechanical switches, pressure shifted spool valves, and mechanical shifted spool valves. However, injection pumps employing each of these types of relay valves have experienced undesirably high failure rates. Such failures usually occur at the bottom end of the power stroke where the relay doesn't quite reset.

With the relays actuated by mechanical switches, problems have been encountered with spring failure. With the pressure shifted spool valve relays, O-ring problems sometimes cause the spool not to shift properly or completely in response to light pressure loads, resulting in stall. Stall occurs because the miniature bleeder valves that operate the spool partially exhaust. Similarly, with the mechanically shifted spool valve relays, stalling may occur as a result of mechanical failure or by a partial bleeding through the relay, thereby robbing the air piston of its driving force.

Conventional air driven injection pumps are commercially available from suppliers such as Arrow Specialty Company of Tulsa, Oklahoma, Haskell, Inc., of Burbank, California, and Sprague Engineering of Gardena, California.

SUMMARY OF THE INVENTION

In accordance with the present invention, a hydraulically actuated pumping apparatus is provided that exhibits superior reliability and control capabilities when compared to conventional injection pumps.

According to one embodiment of the invention, an air driven hydraulic injection pump is provided that is adapted to inject fluid into a vessel or flow line at high pressure at a controlled rate with superior performance and reliability.

According to another embodiment of the invention, a fluid actuated, piston driven injection pump is provided that is adapted to pump liquids at controlled rates and at high pressures without stalling.

According to another embodiment of the invention, a pneumatically driven pumping apparatus is provided that further comprises a three-way normally closed pilot operated relay valve adapted to provide improved control over the air flow through the apparatus without the partial bleeding experienced with conventional air driven injection pumps.

According to yet another embodiment of the invention, a hydraulically actuated positive displacement injection pumping apparatus is provided that comprises a three-way normally closed relay valve controlled by means of a multiported hollow plunger.

According to yet another embodiment of the invention, a fluid actuated, piston driven injection pump is provided that employs a multiported hollow plunger to exhaust pilot pressure past an exhaust seal in the top of the pump, thereby permitting the relay valve to recycle and to exhaust the supply fluid exerting pressure on the driving piston.

According to another embodiment of the invention, a fluid actuated pumping apparatus is provided that employs a supply fluid at a relatively low gauge pressure to drive a large diameter piston which in turn drives a small diameter piston that pumps another fluid at a relatively higher pressure.

According to another embodiment of the invention, a method is provided for operating a gas actuated, piston-driven injection pump in combination with a three-way normally closed relay valve whereby pilot pressure is supplied to the pilot port of the relay valve through an adjustable orifice in fluid communication with the supply port of the relay valve, causing a piston within the relay valve to force a plunger downward, permitting fluid communication between the supply port and the gas-driven piston within the injection pump. The force exerted by the supply gas on the gas-driven piston of the injection pump is thereafter transmitted to the pumping cylinder through a smaller diameter plunger which coacts with the gas-driven piston to produce the desired pumping pressure. At the bottom of the pumping stroke, pilot pressure to the relay valve is exhausted through ports disposed in the end of the pump plunger opposite the pumping cylinder, thereby permitting the piston within the relay valve to recycle, and in turn causing the plunger within the relay valve to block fluid communication between the supply port and the gas-driven piston of the injection pump, and permitting the supply gas within the driving cylinder to be exhausted through the exhaust port of the relay valve.

BRIEF DESCRIPTION OF THE DRAWINGS

The apparatus and method of the invention are further described and explained in relation to the following drawings wherein:

FIG. 3 depicts a cross sectional elevation view of the gas operated injection pump shown in FIG. 1.

DESCRIPTION OF THE PREFERRED EMBODIMENTS

Figure 1:
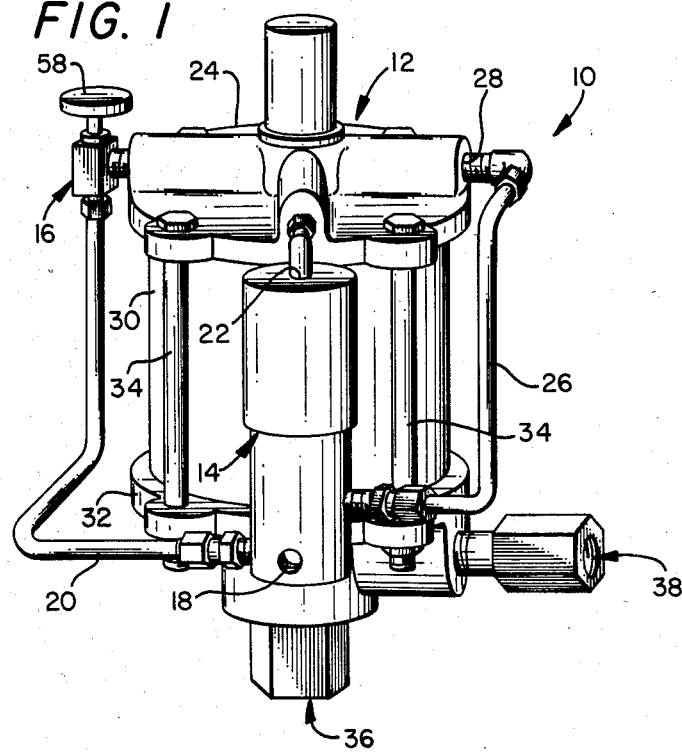
FIG. 1 depicts a perspective view of a preferred embodiment of the pumping apparatus of the invention.

Referring to FIG. 1, pumping apparatus 10 preferably comprises injection pump 12, relay valve 14, and adjustable orifice 16. Supply gas is introduced into relay valve 14 through supply port 18 which also communicates interiorly of relay valve 14 with pilot pressure supply line 20. Although the configuration shown is preferred for use in the apparatus of the invention, it will be apparent to one reading this disclosure that supply port 18 of relay valve 14 and pilot pressure supply line 20 can also be independently connected to the source of supply gas or can be separately supplied from a tee to a common supply line. Supply gas then flows through pilot pressure supply line 20 and adjustable orifice 16 to pilot port 22 of relay valve 14 through upper housing 24 of injection pump 12.

When sufficient supply gas has entered relay valve 14 through pilot port 22 to actuate the valve, fluid communication is also established between supply port 18 and pump supply line 26. Supply gas then enters upper housing 24 of injection pump 12 through pump supply port 28. The supply gas exerts pressure on a piston disposed inside cylinder 30, which in turn coacts with a smaller diameter plunger to pump fluid through a pumping cylinder disposed within lower housing 32, as will be further described in relation to FIG. 3 below. Upper housing 24 and lower housing 32 of injection pump 12 are preferably connected by means of hex bolts 34.

During pumping, the pumped fluid enters lower housing 32 through fluid inlet port 36 and is discharged through fluid outlet port 38.

According to a preferred embodiment of the invention, injection pump 12 and relay valve 14 are both constructed from chemically resistant materials such as stainless steel. Relay valve 14, adjustable orifice 16, pilot pressure supply line 20, pump supply line 26 and the fittings employed therewith are preferably rated for use at supply pressures ranging from about 20 to about 150 psig. Fittings employed on the discharge side of injection pump 12 are preferably rated at pressures up to about 10,000 psi. Although the throughput of pumping apparatus 10 will necessarily vary according to the size of injection pump 12, the pump ratio and the flow of supply gas through adjustable orifice 16 to pilot port 22 of relay valve 14, pumping rates ranging from about one pint up to about 110 gallons per day are achieved with a pump having dimensions of about seven inches by about five and three quarters inches. The pumping apparatus of the invention can be employed for pumping a variety of liquids including, by way of example and without limitation, chemicals, hydrocarbons, water, and the like. The apparatus of the invention provides superior performance when installed in any position. It can also be used with or without an airline lubricator, although an airline lubricator is recommended for extreme pumping for long periods. The weight of the pumping apparatus as described herein is about 17 pounds. The construction and method of operation of pumping apparatus 10 is further described and explained in relation to FIGS. 1 and 2 below.

Figure 2:
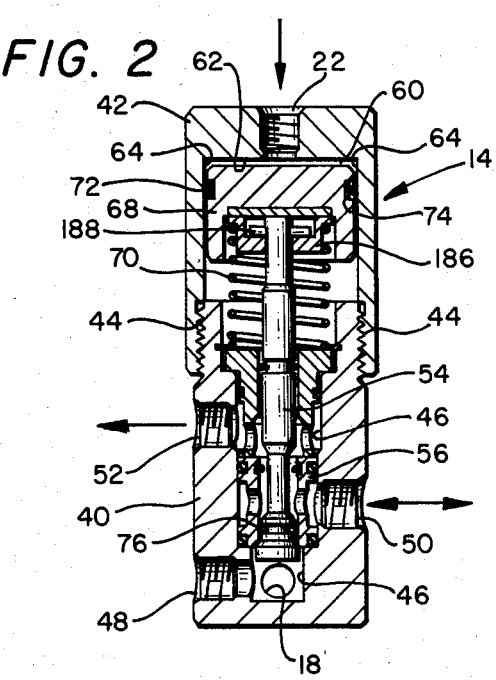
FIG. 2 depicts an elevation view, partially in section, of the three-way normally closed relay valve of FIG. 1.

FIG. 2 is an elevation view, partially in section, of relay valve 14 of pumping apparatus 10. Relay valve 14 is preferably a three-way normally closed pilot operated valve. As shown in FIG. 2, relay valve 14 is adapted for use at working pressures up to about 150 psi. Relay valve 14 further comprises body 40 and piston housing 42, which are preferably made of stainless steel and are interconnected by threads 44. Body 40 further comprises a centrally disposed, stepped longitudinal bore 46 and a plurality of radially extending ports that provide fluid communication through longitudinal bore 46. These ports include supply port 18, pilot pressure supply port 48, valve port 50 and exhaust port 52. Ports 18, 48, 50 and 52 are preferably threaded to facilitate connection with appropriate fittings as desired.

Supply port 18 provides fluid communication between a source of supply fluid and longitudinal bore 46 of body 40. A preferred supply fluid for use with the subject apparatus is a gas such as compressed air, although other gasses, such as natural gas or nitrogen can also be used effectively if desired. The pressure of the supply gas is preferably controlled by a pressure regulator (not shown) disposed between supply port 18 and the supply gas source. The pressure regulator is desirably set at a pressure approximately 10 to 15 psig above the pressure needed to operate the gas-driven piston within injection pump 12. In order for pumping apparatus 10 to function properly, the supply gas pressure should be at least about 20 psi.

Pilot pressure supply port 48 provides fluid communication between supply port 18 and pilot pressure supply line 20, as previously discussed in relation to FIG. 1. Valve port 50 alternately provides fluid communication between pump supply line 26 and either supply port 18 or exhaust port 52, depending upon the position of plunger 54 and spool valve 56 within longitudinal bore 46, as discussed below.

Piston housing 42 further comprises pilot port 22, which is adapted to provide fluid communication with pilot pressure supply line 20 through adjustable orifice 16 and upper housing 24 of injection pump 12. As shown in FIG. 1, adjustable orifice 16 further comprises a manually operated adjustment knob 58 that permits the operator to control the rate of flow of supply gas through pilot pressure supply line 20 to pilot port 22. It is of course understood that an automatic controller with appropriate instrumentation can be substituted for adjustment knob 58 if desired. Likewise, adjustment knob 58 can be calibrated by correlating appropriate indexing marks on the adjustment knob with the corresponding resultant flow rates. When adjustable orifice 16 is opened, supply gas flows inwardly through pilot port 22 into the cylindrical space 60 defined by interior walls 62, 64 of piston housing 42. The pilot pressure then forces piston 68 downward against the counteractive force of compression spring 70, also causing plunger 54 to move downward. Piston 68 is further adapted by means of U-cup seal or O-ring 72 in annular groove 74 to prevent the supply gas from leaking out of cylindrical space 60 between piston 68 and interior wall 64.

When piston 68 and plunger 54 are in the position shown in FIG. 2, supply pressure to valve port 50 is blocked by O-ring 76 and pressure in valve port 50 is opened through the passage between plunger 54 and O-ring 55 to exhaust port 52. However, when pilot pressure forces piston 68 and plunger 54 downward, fluid communication is provided between supply port 18 and valve port 50 around O-ring 76 and fluid communication between valve port 50 and exhaust port 52 is blocked when plunger 54 engages O-ring 55.

When plunger 54 of relay valve 14 has been depressed sufficiently by piston 68 to permit supply gas to flow from supply port 18 through valve port 50 and to block the escape of supply gas from valve port 50 through exhaust port 52, the supply gas is permitted to flow through pump supply line 26 and pump supply port 28 into upper housing 24 of injection pump 12 as shown in FIG. 3. Referring to FIG. 3, supply gas entering upper housing 24 of injection pump 12 through pump supply port 28 is directed through radial bore 78 and axial bore 80 into the cavity 82 defined by bottom 84 of upper housing 24, interior wall 86 of cylinder 30, and face 88 of drive piston 90. As supply gas fills cavity 82, drive piston 90 is forced downward against compression spring 92. O-rings 94, 96 prevent the escape of supply gas along interior wall 86 of cylinder 30.

Injection pump 12 further comprises plunger 98, which extends coaxially through longitudinal bore 100 of upper housing 24, longitudinal bore 102 of drive piston 90, and longitudinal bore 104 of lower housing 32. Shoulder 106 of drive piston 90 is disposed in contacting and abutting relation to shoulder 108 of plunger 98, thereby causing plunger 98 to move downward as drive piston 90 moves downward under the force of the supply gas in cavity 82. O-ring 110 in annular groove 112 of plunger 98 prevents the escape of supply gas downwardly through bore 102 of drive piston 90. The interior of cylinder 30 is vented through passageway 114 of lower housing 32 to prevent pressure buildup in the event of fluid leakage past the O-ring seals within injection pump 12.

The pumping cylinder of injection pump 12 is disposed within longitudinal bore 104 of lower housing 32 and is preferably maintained in coaxial and concentric alignment with upper housing 24 and cylinder 30 by a plurality of hex bolts 34.

Retainer 116 threadedly engages lower housing 32 and further comprises a centrally disposed, stepped longitudinal bore 118 that provides containment for pumping cavity 120, bearing 122, nonextrusion ring 124, Teflon sealing ring 126, packing 128, cylindrical packing guide 130, compression spring 132, spring guide 134 and check valve seat assembly 136. Check valve seat assembly 136 is adapted to seat ball 138, which is also contacted by spring 140. O-rings 142, 144 further assist in preventing fluid leakage around retainer 116.

Retainer 116 preferably further comprises radial passageways 146 that provide fluid communication between pumping cavity 120 and fluid outlet port 38 through annular space 148 and radial bore 150 of lower housing 32. Fluid outlet port 38 is also provided with outlet retainer 152 that threadedly engages lower housing 32. O-ring 154 provides sealing engagement between outlet retainer 152 and lower housing 32. Outlet retainer 152 further comprises stepped radial bore 156 containing a check valve assembly including check valve seat assembly 158, ball 160 and spring 162.

As supply gas forces drive piston 90 downward, plunger 98 is also forced downward inside pumping cavity 120. When this occurs, ball 138 seats itself against check valve seat assembly 136, and fluid disposed in pumping cavity 120 is forced outwardly through radial passageways 146, annular space 148, radial bore 150, outlet retainer 152 and fluid outlet port 38. The construction of lower housing 32, including the threaded engagement between lower housing 32 and retainer 116 and outlet retainer 152 must be sufficient to withstand the discharge pressure of injection pump 12.

Plunger 98 is desirably constructed in such manner that whenever bottom face 164 of plunger 98 reaches the bottom of its stroke, the radially extending passageways 166 at the opposite end of plunger 98 move downward past O-ring 168 so as to establish fluid communication from upper housing pilot inlet port 170 through stepped radial pilot bore 172, annular space 174, radial passageway 176 in plunger guide 178, radial passageways 166 and longitudinal passageway 180 of plunger 98 to plunger cavity 182 and pilot pressure exhaust vents 184 through upper housing 24. When this occurs, the pilot pressure acting on piston 68 of relay valve 14 is exhausted through upper housing 24 of injection pump 12, and compression spring 70 of relay valve 14 forces piston 68 upward within piston housing 42. As piston 68 moves upward, spring guide 186 as shown in FIG. 2 contacts dowel pin 188 which passes through plunger 54, thereby causing plunger 54 to also move in an upward direction. Fluid communication is then blocked between supply port 18 and valve port 50 and is established between valve port 50 and exhaust port 52. Because the back pressure through exhaust port 52 is less than the spring pressure exerted by spring 92 against the underside of drive piston 90 within injection pump 12, drive piston 90 is also forced upward, forcing the supply gas outward through axial bore 80 and radial bore 78 of upper housing 24, outwardly through pump supply port 28 and pump supply line 26, inwardly through valve port 50, and outwardly through exhaust port 52.

As drive piston 90 of injection pump 12 is moved upward by compression spring 92, spiral ring 190 also raises plunger 98, causing fluid to be drawn inwardly through fluid inlet port 36 past ball 138 into pumping cavity 120 in preparation for the next downward stroke.

As plunger 98 moves upward, sealing contact is established between plunger 98 and O-ring 168, preventing further escape of pilot supply gas until the subsequent operation of relay valve 14. O-rings 161, 163 seal inside and outside of plunger guide 178 to prevent commingling of supply gas in cavity 174 and supply gas in cavity 82. Pumping apparatus 10 will then continue to cyclically function in this manner for so long as supply pressure is maintained to supply port 18.

Although the apparatus and method of the invention are described herein in relation to the preferred embodiment shown in FIGS. 1–3, certain design alterations and modifications will become apparent to those of ordinary skill in the art upon reading this disclosure in connection with the accompanying drawings. For example, the design and/or arrangement of the check valves can be altered to permit the use of other well known, commercially available components without departing from the spirit and scope of the invention. Similar variations may also apply to the plunger configuration, sealing means, piston design, mounting methods and procedures, orifice adjustment for rate control, choice of materials, and weather protection. It is intended, however, that the scope of the invention be limited only by the appended claims.

What is claimed:

1. A hydraulically actuated pumping apparatus comprising a piston-driven, plunger-type injection pump in combination with a three-way normally closed pilot-operated relay valve, means adjustable during operation of said pumping apparatus for controlling the flow of a pilot fluid to said relay valve, and means for venting said pilot fluid from said relay valve through passageways in the plunger of said injection pump at the completion of each pumping stroke.

2. The apparatus of claim 1 wherein said relay valve is adapted to operate at a pilot pressure ranging from about 20 to about 150 psig.

3. The apparatus of claim 1 wherein said injection pump is adapted to operate at a pumping pressure ranging up to about 10,000 psig.

4. The apparatus of claim 1 wherein said injection pump is adapted to be driven by a pressurized gaseous fluid.

5. The apparatus of claim 4 wherein said gaseous fluid is selected from the group consisting of air, natural gas and nitrogen.

6. The apparatus of claim 5 wherein said gaseous fluid is air.

7. The apparatus of claim 5 wherein said gaseous fluid is natural gas.

8. The apparatus of claim 5 wherein said gaseous fluid is nitrogen.

9. Hydraulic pumping apparatus comprising a hydraulically actuated, piston driven, positive displacement injection pump in combination with a three-way normally closed relay valve comprising a supply port, a pilot pressure supply port, a valve port, a pilot port and an exhaust port;

means for connecting an actuating fluid supply source to the supply port of said relay valve;

means adjustable during operation of said pumping apparatus for controlling the flow of said actuating fluid from said pilot pressure supply port to said pilot port;

means within said relay valve for providing fluid communication between said supply port and said valve port and for blocking fluid communication between said valve port and said exhaust port in response to increasing flow through said pilot port;

means for providing fluid communication between said valve port and the drive piston of said pump;

plunger means within said pump having a diameter smaller than that of said drive piston, said plunger being further adapted to coact with said drive piston, and one end of said plunger being slidably disposed within a pumping cylinder coaxially aligned with said drive piston;

means for controlling fluid flow into and out of said pumping cylinder so that fluid is discharged from said pumping cylinder whenever said plunger is moved downward by the force of said actuating fluid against said drive piston;

means within said pump for providing fluid comunication between said pilot port of said relay valve and said plunger at the end of said plunger that is opposite said pumping cylinder;

passageways within the end of said plunger opposite said pumping cylinder for providing fluid communication through the end portion of said plunger;

means for venting actuating fluid from said pilot port of said relay valve through said passageways in the end of said plunger whenever said plunger is in its lowermost position, thereby causing means within said relay valve to block fluid communication between said supply port and said valve port and to establish communication between said valve port and said exhaust port, thereby permitting actuating fluid from said pump to be exhausted through said exhaust port and causing said drive piston and said plunger to move to a position blocking fluid communication between the pilot port of said relay valve and the passageways in the end of said plunger.

10. The apparatus of claim 9, further comprising means for providing actuating fluid to the supply port of said relay valve at a pressure ranging from about 20 to about 150 psig.

11. The apparatus of claim 9 wherein the ratio of the diameter of said drive piston to the diameter of said plunger is such that pressure within said pumping cylinder during pumping ranges up to about 10,000 psig.

* * * * *